United States Patent
Maes

Patent Number: 5,568,851
Date of Patent: Oct. 29, 1996

[54] TRANSMISSION ACTIVATING AND NEUTRALIZING SYSTEM

[75] Inventor: Richard J. Maes, Raleigh, N.C.

[73] Assignee: Caterpillar Inc., Peoria, Ill.

[21] Appl. No.: 377,521

[22] Filed: Jan. 20, 1995

[51] Int. Cl.[6] ................................................ B60K 41/26
[52] U.S. Cl. ........................... 192/9; 192/4 A; 192/4 C
[58] Field of Search ......................... 192/4 C, 9, 4 A; 361/167, 194

[56] References Cited

U.S. PATENT DOCUMENTS

| | | | |
|---|---|---|---|
| 761,459 | 5/1904 | Eastwood | 192/4 CX |
| 2,344,881 | 3/1944 | Jory | 192/4 CX |
| 2,426,365 | 8/1947 | Matlock | 192/4 CX |
| 2,613,773 | 10/1952 | Gilfillan | 192/4 C |
| 2,658,403 | 11/1953 | Marco | 192/4 CX |
| 2,692,353 | 10/1954 | Mason et al. | 361/167 X |
| 2,827,977 | 3/1958 | Moore | 361/194 X |
| 3,480,120 | 11/1969 | Lenzen et al. | 192/4 R |
| 3,601,231 | 8/1971 | Kolacz | 188/69 |
| 3,780,839 | 12/1973 | Schroeder | 192/4 A |
| 4,273,224 | 6/1981 | Brown et al. | 192/4 A |
| 4,660,696 | 4/1987 | Kusaka | 192/4 A |
| 5,111,921 | 5/1992 | Marks et al. | 192/4 A |
| 5,154,267 | 10/1992 | Watts | 192/4 A |

*Primary Examiner*—Rodney H. Bonck
*Attorney, Agent, or Firm*—Claude F. White; Diana L. Charlton

[57] ABSTRACT

A system for activating and neutralizing a transmission of a work machine includes an electrical circuit having a latching relay. The transmission is shifted by electrical solenoids which are activated by electrical current through the latching relay. Current to the latching relay is provided from an electrical source through a parking brake switch. When the parking brake is applied, the switch is open and the latching relay is de-activated. If the transmission is left in a forward or reverse position when the parking brake is applied, the machine will not move when the parking brake is released because the latching relay is still de-activated. To activate the latching relay, the transmission shifting mechanism must be moved to neutral. The transmission can then be shifted into forward or reverse positions.

10 Claims, 1 Drawing Sheet

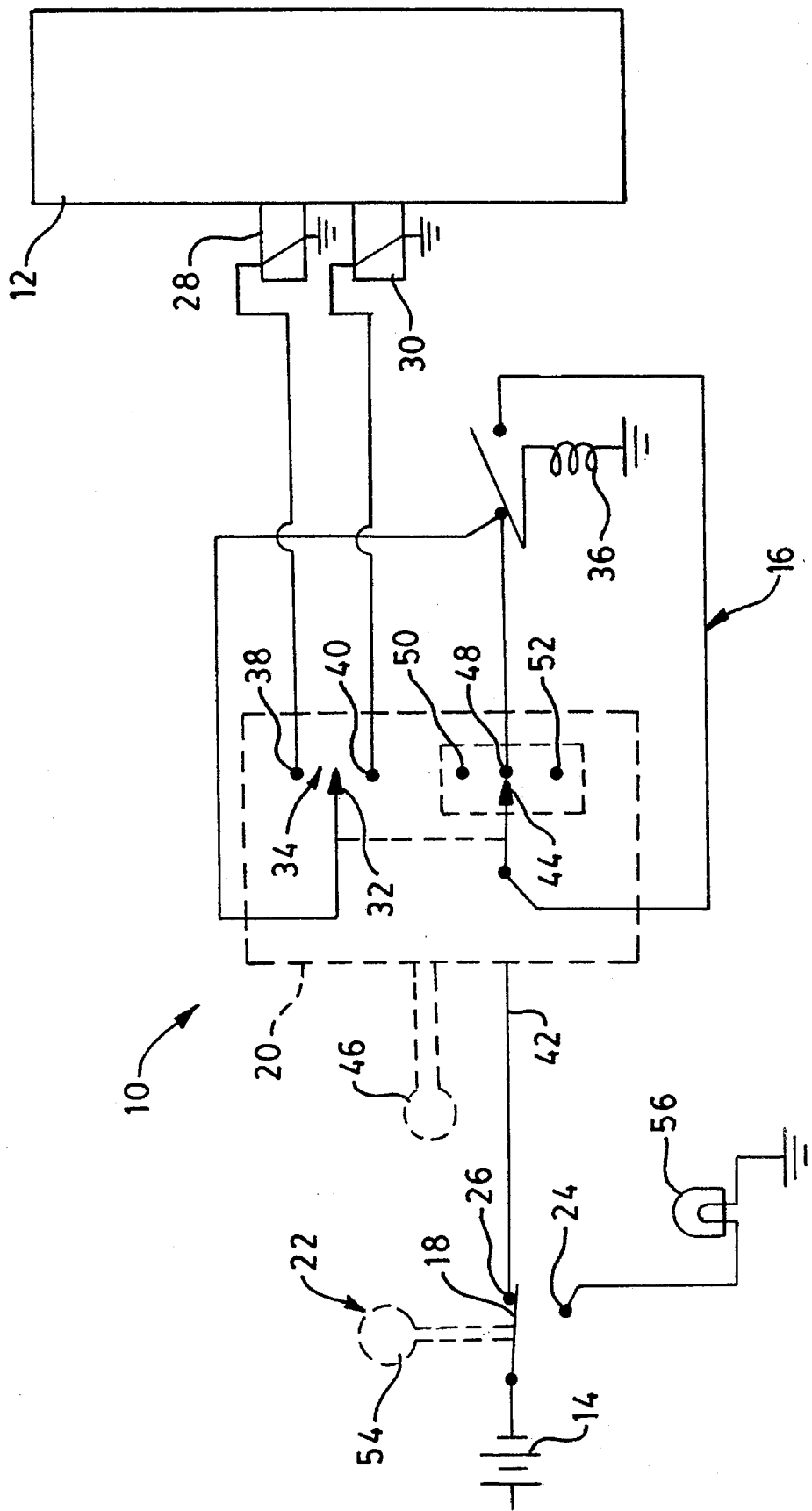

`5,568,851`

TRANSMISSION ACTIVATING AND NEUTRALIZING SYSTEM

TECHNICAL FIELD

This invention relates generally to a system for activating and neutralizing a power transmission of a work machine and more particularly to a system for preventing activation of the power transmission under certain situations.

BACKGROUND ART

State of the art earthmoving and construction machines utilize power transmissions which are activated by hydraulic control valves and actuators. For convenience and ease of operation, many of these control valves are actuated by hydraulic pilot systems and/or electrical solenoids. In certain situations, the transmission control lever could be left in a forward or reverse position when the parking brake is applied. If the parking brake is then released without shifting the transmission control lever to neutral, the machine could possible move unexpectedly.

The present invention is directed to overcoming one or more of the problems as set forth above.

DISCLOSURE OF THE INVENTION

In one aspect of the present invention, a system for activating and neutralizing a power transmission of a machine includes a source of electrical power, first and second electrically controlled actuators, an electrical circuit having a latching relay, a transmission shifting mechanism, a switch having first and second positions, and means for moving the switch between the first and second positions. The switch is connected between the electrical power source and the electrical circuit and, depending on the position of the switch, sends electrical power to the circuit, or interrupts power to the circuit.

Electrical and hydraulic control circuits are used extensively for operating and controlling the various functions and work implements of earthmoving and construction machines. Electrically actuatable solenoids are utilized to operate various functions, such as a transmission, and the solenoids are activated by an electrical circuit and a control or shifting lever. The electrical circuit obtains its power from a battery or electrical generating system.

In prior systems, the control lever, which controls the forward and reverse modes of the transmission, can be left in an actuated position when the parking brake is applied. When the parking brake is then released, the machine can move unexpectedly because the control lever is still in a forward or reverse position.

The subject system offers a solution to the problems noted above by providing a switch which is activated by the parking brake, and which interrupts the flow of electrical current to the electrical circuit.

BRIEF DESCRIPTION OF THE DRAWINGS

The drawing is a schematic illustration of a control system and electrical circuit incorporating the subject invention.

BEST MODE FOR CARRYING OUT THE INVENTION

With reference to the drawing, a system 10 for activating and neutralizing a power transmission 12 of a machine (not shown) includes a source of electrical power, such as a battery 14, or an electrical generating system, an electrical circuit 16, a switch 18, a transmission shifting mechanism 20, and means 22 for moving the switch 18 between a first open position 24 and a second closed position 26. The system further includes first and second electrically controlled actuators 28,30, such as electrical solenoids 28,30. The electrical circuit 16 includes a movable connector 32 having a neutral position 34, a latching relay 36, and first and second active contacts 38,40 which are connected respectively to the first and second solenoids 28,30. The electrical circuit 16 is connected to the electrical power source 14 through the switch 18 and a line 42.

The transmission shifting mechanism 20 includes a position indicator 44 and a shifting lever 46 for shifting the movable connector 32 from the neutral position 34 into contact with either the first or second active contacts 38,40. The position indicator 44 includes a neutral indicating point 48 and forward and reverse indicating points 50,52. The first active contact 38 represents a forward position of the transmission 12 and the machine, and the second active contact 40 represents a reverse position of the transmission 12 and the machine.

The means 22 for moving the switch 18 includes a parking brake lever 54. The first open position 24 of the switch 18 corresponds to an applied position of the parking brake and lever 54, and the second closed position 26 of the switch 18 corresponds to a non-applied, or released, position of the parking brake and lever 54. A parking brake light 56 is provided and is lighted when the parking brake and lever 54 are applied.

INDUSTRIAL APPLICABILITY

With reference to the drawing and the previous description, the subject invention is particularly useful with construction and earthmoving machines. These machines include a transmission for transmitting the power from an engine to propel the machine in a forward and reverse direction. The transmission 12 is shiftable by a lever 46 between a neutral point 48 and a forward or reverse point 50,52. The machine includes a parking brake lever 54 for applying a parking brake to ensure that the machine does not move. The parking brake is normally applied when the machine is stopped for some time, when the operator leaves the operator's station, and at other times. When the parking brake and lever 54 are applied, the switch 18 is moved to the first or open position 24 and the electrical current from the battery 14 or source is interrupted. This causes the latching relay 36 to open and electrical current to the solenoids 28,30 is interrupted and the transmission shifts to neutral.

In most situations, the machine operator will shift the transmission into neutral with the lever 46 before applying the parking brake lever 54. However, if the operator leaves the transmission shifting mechanism in a forward or reverse position 50,52 when he applies the parking brake lever 54, the transmission is still neutralized when the switch 18 is opened. When the parking brake lever 54 is released and the switch 18 is closed, the electrical current flows to the electrical circuit 16. However, even though the transmission shifting mechanism 20 may be in a forward or reverse position 50,52, the machine will not move because the solenoids 28,30 cannot be activated until the latching relay 36 is activated. In order to activate the latching relay 36, the transmission shifting mechanism 20 must be moved by the operator to the neutral position 34. This allows electrical current to flow to the latching relay 36, which then latches closed. The transmission shifting mechanism 20 can then be moved by the lever 46 to the forward or reverse position 50,52, and the electrical current reaches the solenoids 28,30 through the latched relay 36.

Other aspects, objects, and advantages of this invention can be obtained from a study of the drawing, the disclosure and the appended claims.

I claim:

1. A system for activating and neutralizing a power transmission of a machine, comprising:

a source of electrical power;

first and second electrically controlled actuators;

an electrical circuit having a movable connector having a neutral position, a latching relay and first and second active contacts connected respectively to said first and second electrically controlled actuators, said circuit being connectable to said electrical power source;

a switch having first and second positions and connected between said electrical power source and said electrical circuit;

a transmission shifting mechanism for shifting said movable connector from said neutral position and into contact with one of said first and second active contacts; and means for moving said switch between said first and second positions, said moving means selectively activating the latching relay to an open position and said transmission shifting mechanism selectively activating the latching relay to a closed position.

2. A system, as set forth in claim 1, wherein said moving means includes a parking brake lever.

3. A system, as set forth in claim 2, wherein the first position of said switch corresponds to an applied position of said parking brake lever and said second position of said switch corresponds to a non-applied position of said parking brake lever.

4. A system, as set forth in claim 1, wherein said first and second electrically controlled actuators include first and second electrical solenoids.

5. A system, as set forth in claim 1, wherein said source of electrical power includes a battery.

6. A system, as set forth in claim 1, wherein said first active contact enables said machine to move in a forward direction and said second active contact enables said machine to move in a reverse direction.

7. A system, as set forth in claim 1, wherein said shifting mechanism includes a lever and said movable connector is associated with said lever.

8. A method of activating and neutralizing a power transmission of a machine, having a system including a source of electrical power, a parking brake lever, first and second electrically controlled actuators, a switch having open and closed positions, an electrical circuit having a latching relay, a movable connector having a neutral position, a transmission shifting lever having neutral, forward and reverse positions, and first and second active contacts connected respectively to said first and second electrically controlled actuators, said electrical circuit being connectable to said electrical power source, said method of neutralizing said power transmission including the steps of:

providing electrical power from said power source through said closed position of said switch and to said electrical circuit;

actuating said parking brake lever so that said switch by said parking brake lever is moved to said open position;

de-activating said latching relay; and de-activating said actuators and said power transmission.

9. A method, as set forth in claim 8 wherein the method of actuating said power transmission includes the steps of:

releasing said parking brake lever so that said switch is moved to the closed position;

energizing said electrical circuit by actuating said latching relay;

moving said transmission shifting lever from said neutral position to one of said forward and reverse positions so that the electrical circuit is connected to one of the first and second active contacts; and activating one of said first and second actuators.

10. A method, as set forth in claim 9 including an additional step if said transmission shifting lever is in one of said forward or reverse positions when said latching relay is de-activated, said additional step including moving said transmission shifting lever from said one of said forward and reverse positions to said neutral position to activate said latching relay.

* * * * *